Figure 4:
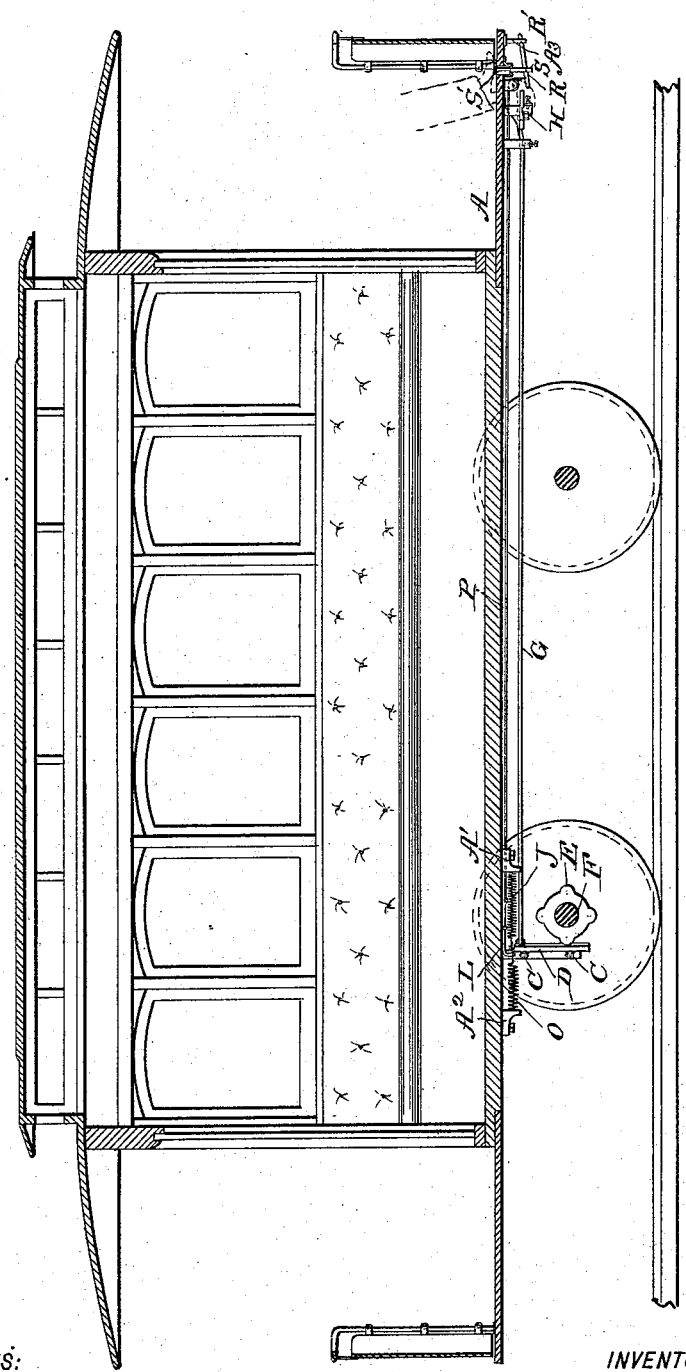

(No Model.) 2 Sheets—Sheet 1.
S. A. WHITE & A. M. GLOVER.
BELL RINGING DEVICE FOR VEHICLES.
No. 536,499. Patented Mar. 26, 1895.
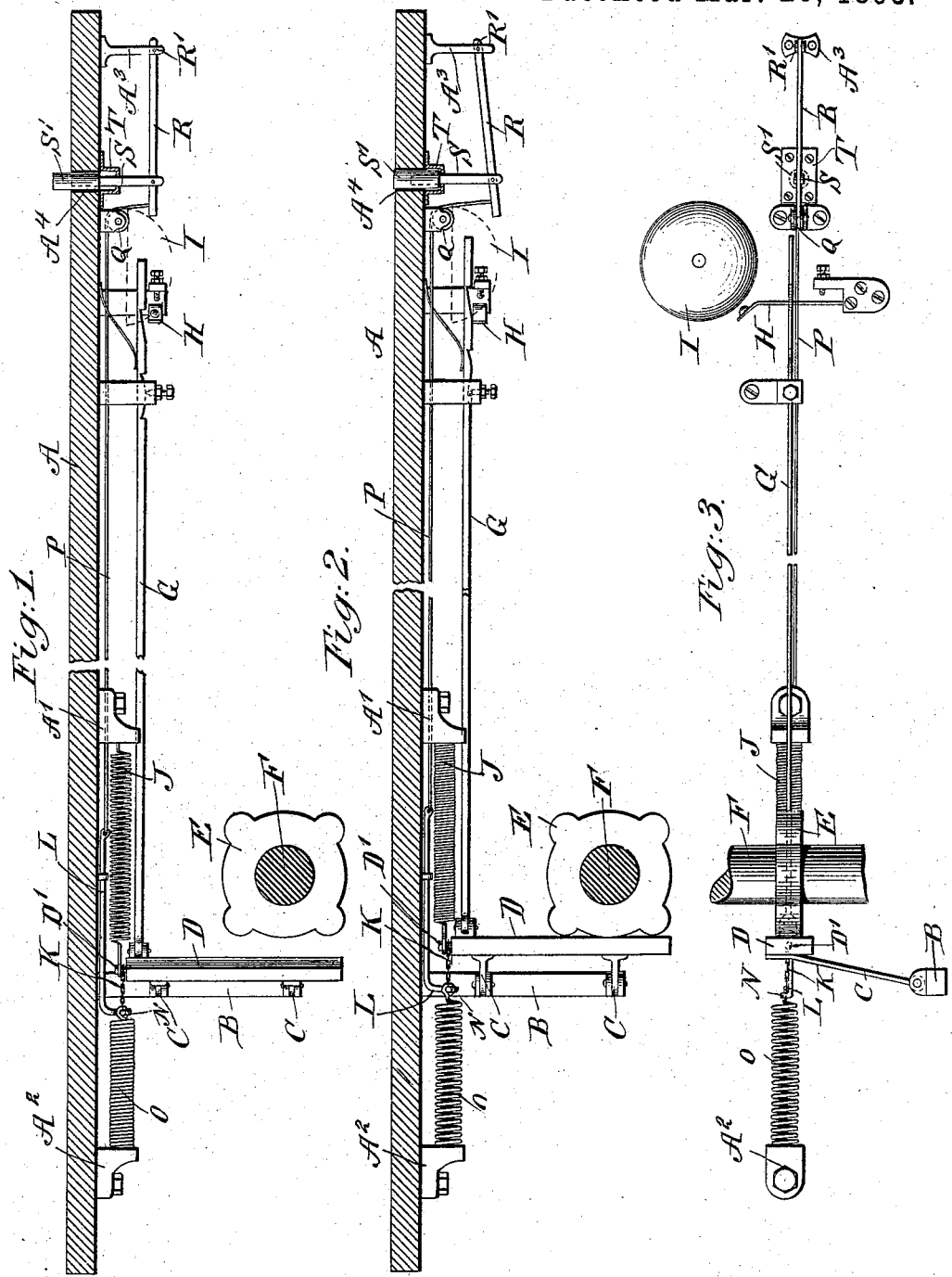
WITNESSES:
John A. Rennie
C. Sedgwick
INVENTORS:
S. A. White
A. M. Glover
BY Munn & Co.
ATTORNEYS.

(No Model.) 2 Sheets—Sheet 2.

S. A. WHITE & A. M. GLOVER.
BELL RINGING DEVICE FOR VEHICLES.

No. 536,499. Patented Mar. 26, 1895.

WITNESSES:
John A. Rennie
Jos. A. Ryan

INVENTORS:
S. A. White
A. M. Glover
BY Munn & Co.
ATTORNEYS.

UNITED STATES PATENT OFFICE.

SAMUEL A. WHITE AND AUGUSTUS M. GLOVER, OF SAVANNAH, GEORGIA.

BELL-RINGING DEVICE FOR VEHICLES.

SPECIFICATION forming part of Letters Patent No. 536,499, dated March 26, 1895.

Application filed September 9, 1893. Serial No. 485,174. (No model.)

*To all whom it may concern:*

Be it known that we, SAMUEL A. WHITE and AUGUSTUS M. GLOVER, both of Savannah, in the county of Chatham and State of Georgia, have invented a new and Improved Bell-Ringer, of which the following is a full, clear, and exact description.

Our invention is an improvement in the class of car bell-ringer attachments which are operated from the axle of a car. The construction, arrangement, and operation of the same are as hereinafter described.

Reference is to be had to the accompanying drawings, forming a part of this specification, in which similar letters of reference indicate corresponding parts in all the views.

Figure 1 is a side elevation of the improvement as applied and with the car bottom and axle in section, the pivot bar being in a normal position, that is, out of engagement with the projections. Fig. 2 is a similar view of the same with the pivot bar in engagement with the projections; and Fig. 3 is an inverted plan view of the improvement. Fig. 4 is a sectional view showing our attachment applied to a street car.

Upon the under side of the bottom A of the car, on which the improvement is applied is secured a bracket B on which are pivoted the arms C supporting a vertically disposed bar D, adapted to be moved in and out of contact with projections E secured on the axle F of the car. Normally the bar D is out of contact with the projections E, as illustrated in Fig. 1. The bar D is connected with a longitudinally-extending rod G, adapted to actuate the striker H for the alarm bell I, as hereinafter described.

In the upper end of the bar D is firmly seated a pin D', rigidly connected with one end of a spring J attached at its other end to a bracket A' secured on the under side of the car bottom A. The pin D' is also connected by a chain K with one end of a spring O attached at its other end to a bracket A² secured to the under side of the car bottom A. The spring O is somewhat stronger than the spring J and extends in an opposite direction from the latter, so that the force of the spring O holds the spring J extended and the bar D out of contact with the projections E, as will be readily understood by reference to Fig. 1 of the drawings. The spring O is also connected at the point of connection therewith of the chain, with a lug on the bent end of a rod L held to slide in an eye secured to the under side of the car bottom A, said rod being connected at its other end with a rope P extending forwardly under the car bottom A, and passing over a pulley Q to connect with a lever R, fulcrumed at R' on a bracket A³ secured to the under side of the car bottom A at the front end thereof.

A rod S is pivotally connected with the lever R, and extends upward into an aperture A⁴ in the car bottom A, in which aperture and in an aligning aperture in a guide bracket T secured to the under side of the car bottom, the rod is adapted to move. The upper end of the rod is normally flush with the upper surface of the car bottom A, and the aperture A⁴ in the car bottom is sufficiently large to permit of the application to the rod S of a cap or foot piece S', as shown in Figs. 1 and 2. When it is not desired to sound the alarm bell I the cap or foot piece S' is removed from the rod S, and as the upper end of the rod is then flush with the upper face of the car bottom, it is impossible for the bell to ring; but when the several parts are in the position illustrated in Fig. 1, then the upper end of the foot-piece S' projects a suitable distance above the top surface of the car bottom A, so that the said foot-piece can be pressed on by the operator's foot whenever the operator finds it necessary to sound the alarm bell I.

The operation is as follows: As shown in Fig. 1, the bar D, is held out of contact with the projections E by the preponderance of pressure exerted by the spring O over the spring J. Now, when it is desired to sound the alarm, the operator presses upon the projecting foot-piece S', and depresses it, thus throwing the other parts of the attachment into the operative position shown in Fig. 4; that is to say, the lever, R, is pushed downward, whereby a pull is exerted on the rope P, the latter causing a forward movement of the rod L and chain K and an extension of the coil spring O, at the same time permitting the spring J to exert its force on the pin D' of the bar D so as to draw the latter forward. The bar D swings forwardly on the arms C and moves in contact with the projections E revolving with the axle F of the car, so that the said projections now alternately strike the bar D so as to impart a vibrating motion to the same to cause the rod G to actuate the striker H so as to sound the alarm bell I.

It will be seen that the bar D is held in contact with the projections E by the force of the spring J, and said bar is free to move rearward as it will be understood that the spring O during this operation is held in a stretched condition so long as the operator presses his foot on the cap or foot piece S', so that the spring O exerts no strength on the bar D and the latter is only drawn on by the spring J. As soon however, as the operator releases the pressure on the cap or foot-piece S', the spring O exerts its force on the chain K so as to draw the bar rearwardly and out of contact with the projections E, and at the same time the spring J is expanded, owing to the superior force of the spring O. The rearward movement of the rod L also causes a pull on the rope P, so that the lever R is swung upward and the arms S again move upward to bring the upper end of the foot-piece S' above the top surface of the car bottom A. It will be seen that by this arrangement the operator in charge of the car simply places his foot on the foot-piece S' so as to press the latter downward and hold it downward as long as he desires an alarm to be sounded. The moment he removes his foot from the foot-piece S', the alarm ceases, as above described.

Having thus described our invention, we claim as new and desire to secure by Letters Patent—

1. In a bell ringer attachment for cars, the combination, with projections revolving with an axle, of a hinged swinging bar arranged in striking proximity to said projections, and two springs which are of different tension, and connected with the aforesaid bar, as specified, whereby they act in opposite directions, a rod or other suitable connection arranged beneath the car and connected with the springs, and means for applying tension to said rod to overcome the stronger spring, and thereby allow the weaker one to throw the swinging bar into contact with the projections for working an alarm, substantially as described.

2. In a bell ringer attachment for cars, the combination with an axle and radial projections fixed thereon, a bar hinged vertically in striking proximity to said projections, two springs of different tension connected with and arranged on opposite sides of said bar, the stronger spring being on the side farthest from the axle, whereby the bar is held normally out of contact with said projections, by the excess of the tension of the stronger over the weaker spring, a pull-rod, one end of which is connected with said stronger spring and a lever and foot piece connected with the other end of said rod, whereby the excess of the stronger spring is overcome at will by the operator, as shown and described.

3. A bell ringer, comprising a pivoted bar connected with the striker of the alarm bell, projections held on the car axle and adapted to engage the said bar, a spring for normally holding the said bar out of contact with the projections, a second spring for holding the said bar in contact with the projections, and means, substantially as described, for locking the first named spring to permit the second spring to act on the bar, as set forth.

4. A bell ringer, comprising a pivoted bar connected with the striker of the alarm bell, projections held on the car axle and adapted to engage the said bar, a spring for normally holding the said bar out of contact with the projections, a second spring for holding the said bar in contact with the projections, a chain connecting said second spring and said bar, an arm movable beneath the car bottom and also connected with said second spring, a rope connected with the said rod, a lever connected with the said rope, and a rod having a removable foot-piece and connected with the said lever, substantially as shown and described.

5. In a bell ringer attachment for cars, the combination, with projections revolving with an axle, of a hinged bar arranged so as to swing parallel to itself whereby it always engages the said projections regardless of the variation in distance between the axle and floor of the car and regardless of the direction in which the car is moving, and two springs which are of different tension, and connected with the aforesaid bar, as specified, whereby they act in opposite directions, a rod, arranged beneath the car and connected with the springs; and means for applying tension to said rod, to overcome the stronger spring and thereby allow the weaker one to throw the swinging bar into contact with the projections, for working an alarm, substantially as described.

6. In a bell-ringer attachment for cars, the combination with an axle and radial projections fixed therein, a bar pivoted vertically in striking proximity to said projections, two springs of different tension connected with and arranged on opposite sides of said bar, and a hammer for striking the bell the stronger spring being on the side farthest from the axle whereby the bar is held normally out of contact with said projections, a rigid rod, or a flexible connection between the stronger spring at one end and a lever and foot piece at the other end whereby the force is applied to said spring by tension instead of by pressure and the buckling of the said rod thereby avoided, a notched rod connecting with the said vertically pivoted bar, the said notch catching and releasing the bell hammer automatically the force being applied from the vertically pivoted bar by tension avoiding the buckling of the said notched bar, all as shown and described.

SAMUEL A. WHITE.
AUGUSTUS M. GLOVER.

Witnesses:
JOSEPH J. GLEASON,
LAWRENCE T. DOYLE.